(12) United States Patent
Hayashi et al.

(10) Patent No.: US 6,315,415 B1
(45) Date of Patent: *Nov. 13, 2001

(54) IMAGE PROJECTOR

(75) Inventors: Kohtaro Hayashi, Toyonaka; Yasumasa Sawai, Yamatotakada; Shunta Takimoto, Nishinomiya; Kenji Konno, Sakai, all of (JP)

(73) Assignee: Minolta Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 7 days.

(21) Appl. No.: 09/259,580

(22) Filed: Mar. 1, 1999

(30) Foreign Application Priority Data

Feb. 27, 1998 (JP) .................................................. 10-046653

(51) Int. Cl.$^7$ ..................................................... G03B 21/28
(52) U.S. Cl. ................................................. 353/98; 353/31
(58) Field of Search ............................... 353/31, 34, 33, 353/98; 349/5, 8; 359/649, 650, 651

(56) References Cited

U.S. PATENT DOCUMENTS

| | | | | |
|---|---|---|---|---|
| Re. 35,310 | * | 8/1996 | Mosokovich | 359/649 |
| 5,353,156 | * | 10/1994 | Chung | 359/649 |
| 5,381,197 | * | 1/1995 | Yoshida et al. | 353/98 |
| 5,504,629 | | 4/1996 | Lim | 359/850 |
| 5,539,579 | * | 7/1996 | Miyatake et al. | 359/634 |
| 5,564,811 | | 10/1996 | Lim | 353/99 |
| 5,631,750 | * | 5/1997 | Minoura et al. | 349/110 |
| 5,743,612 | | 4/1998 | Matsuda et al. | 353/97 |
| 5,805,347 | * | 9/1998 | Mizutani et al. | 359/663 |
| 5,949,589 | * | 9/1999 | Nakazawa | 359/753 |

FOREIGN PATENT DOCUMENTS

| | | |
|---|---|---|
| 4-194921 | 7/1992 | (JP) . |
| 4-207676 | 7/1992 | (JP) . |
| 5-203872 | 8/1993 | (JP) . |
| 6-250120 | 9/1994 | (JP) . |
| 7-152027 | 6/1995 | (JP) . |
| 8-82763 | 3/1996 | (JP) . |
| 8-82764 | 3/1996 | (JP) . |
| 8-313860 | 11/1996 | (JP) . |
| 8-327966 | 12/1996 | (JP) . |
| 9-133974 | 5/1997 | (JP) . |
| 9-243990 | 9/1997 | (JP) . |

* cited by examiner

*Primary Examiner*—Safet Metjahic
*Assistant Examiner*—Etienne LeRoux
(74) *Attorney, Agent, or Firm*—Sidley Austin Brown & Wood

(57) ABSTRACT

A projector has an illumination optical system, a reflection-type display panel, a projection optical system, and light-introducing device. The display panel is illuminated by the illumination light emitted from the illumination optical system and is divided into a plurality of pixels to reflect the incoming illumination light selectively in accordance with the pattern formed by those pixels and thereby produce projection light. The projection optical system transmits the projection light reflected from the display panel to project the pattern formed by the pixels onto a projection plane on which to form a projected image, and is composed of, from the projected-image side, a front lens unit, an aperture stop, and a rear lens unit. The light-introducing device is disposed between the front and rear lens units and directs the illumination light to the display panel. The projection optical system fulfills the condition $$0.2 \leq \gamma F \leq 0.8$$

where $\gamma F$ represents the angular magnification of the front lens unit.

25 Claims, 9 Drawing Sheets

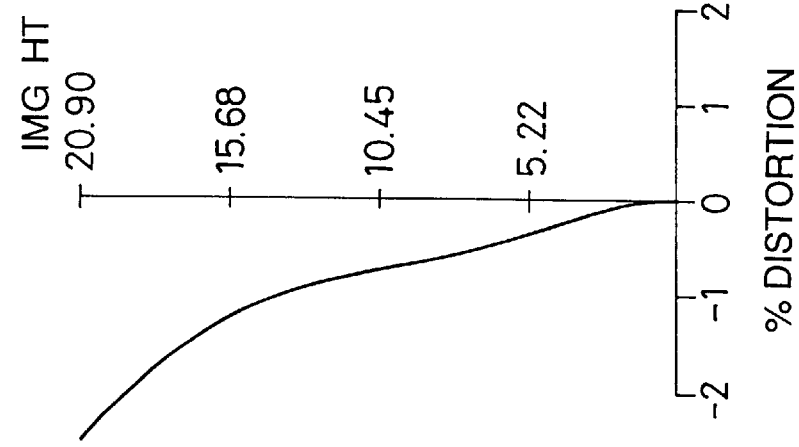
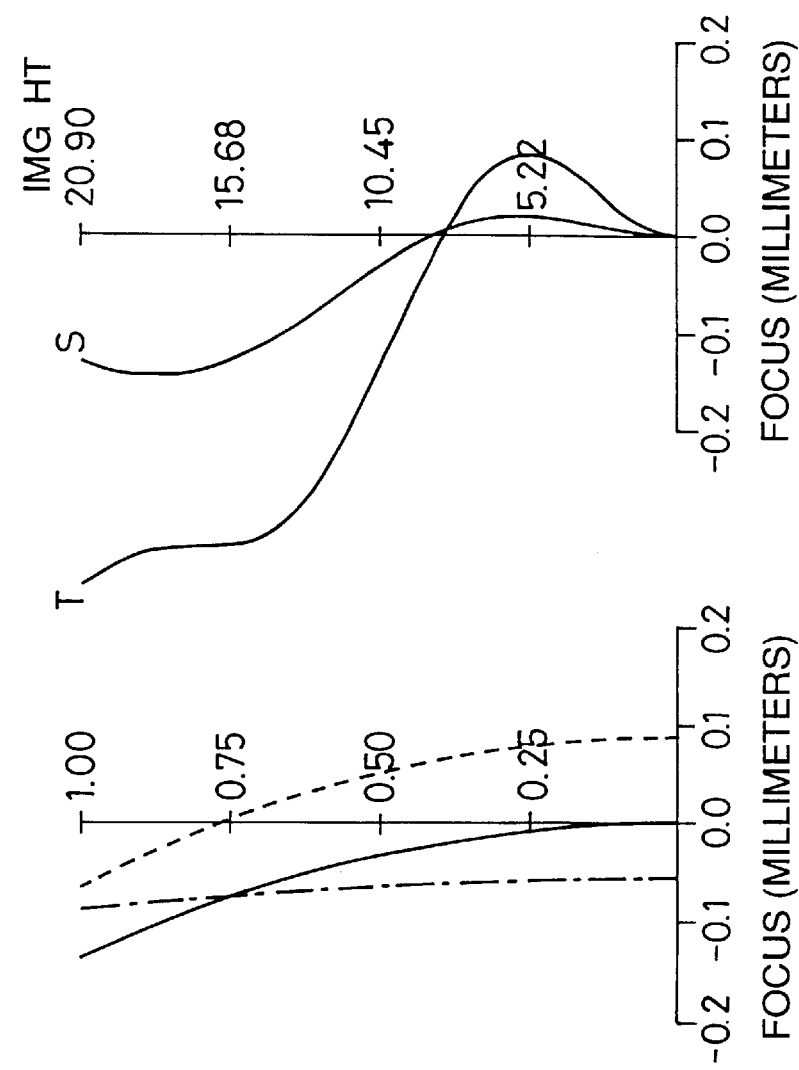

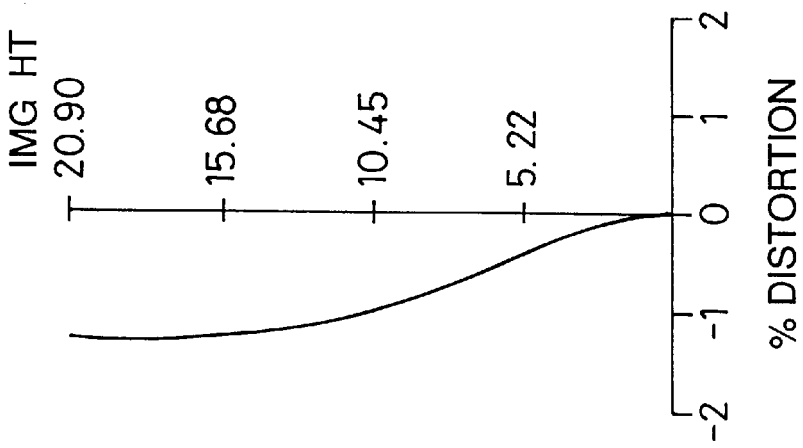
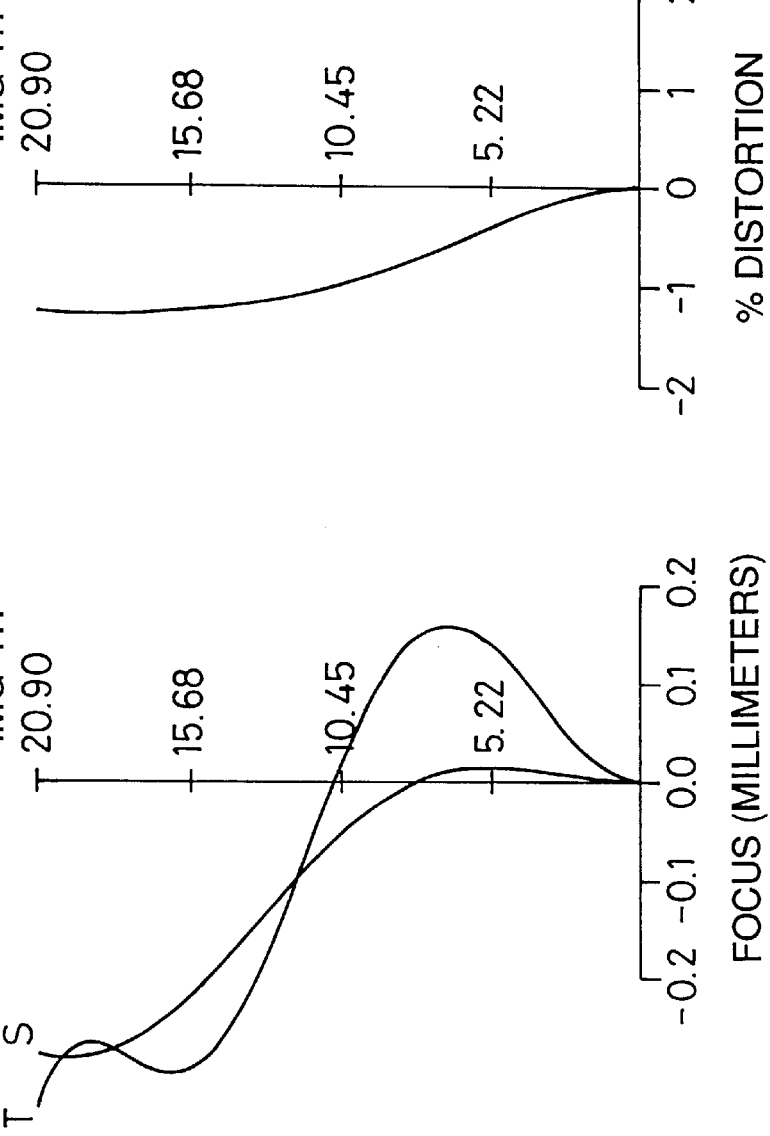
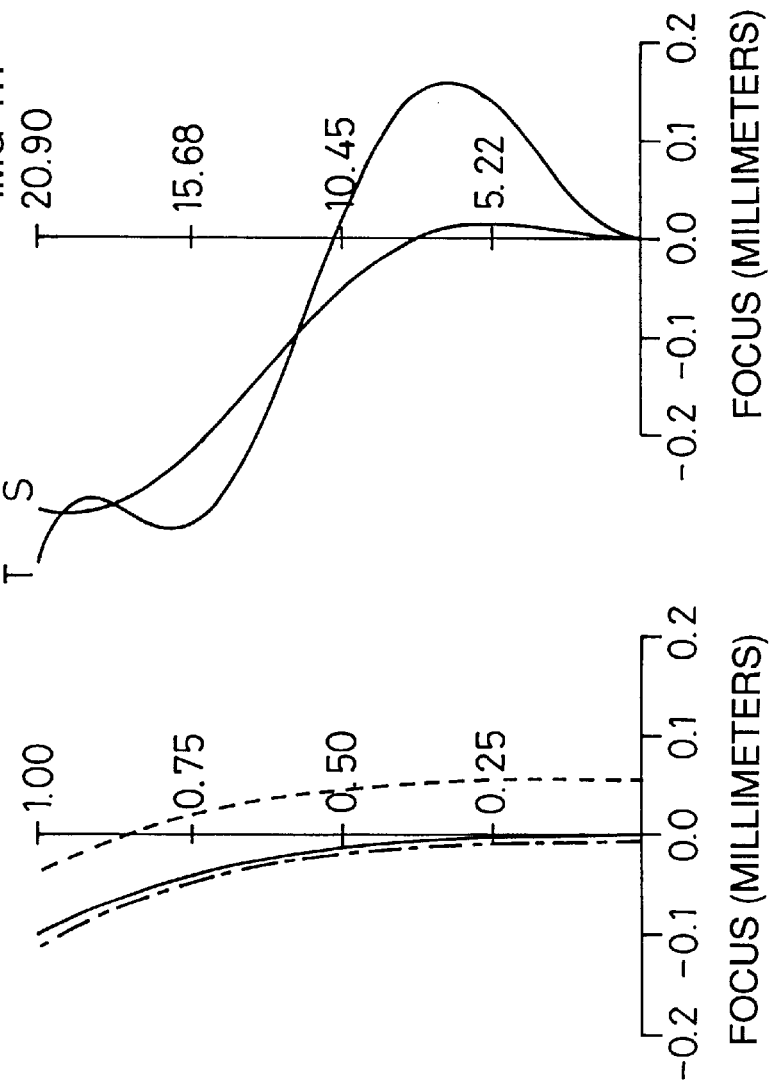
FIG. 11A LONGITUDINAL SPHERICAL ABER.
FIG. 11B ASTIGMATIC FIELD CURVES
FIG. 11C DISTORTION

IMAGE PROJECTOR

This application is based on application No. H10-046653 filed in Japan, the content of which is hereby incorporated by reference.

BACKGROUND OF THE INVENTION

1. Field of the Invention

The present invention relates to an image projector, and more particularly to an image projector (such as a liquid crystal projector) for projecting an image from a reflection-type display panel (such as a reflection-type liquid crystal panel) onto a screen.

2. Description of the Prior Art

According to a known method for achieving appropriate illumination in an image projector of the type that projects an image displayed on a reflection-type display panel onto a screen, light for illumination is directed to the reflection-type display panel by the use of a reflection mirror that is disposed in the vicinity of an aperture stop so as to cover about a half of the aperture diameter. FIG. 12 shows the outline of the optical arrangement of such an image projector. This image projector has a projection optical system and an illumination optical system. The projection optical system is composed of a front lens unit (GrF), a reflection mirror (M), an aperture stop (A), and a rear lens unit (GrR). The illumination optical system is composed of a condenser lens (CL).

The light beam from a light source (1) is formed into a substantially parallel beam by a reflector (2), and is then condensed by the condenser lens (CL) so as to form an image of the light source. The light source (1), the reflector (2), the condenser lens (CL), and the reflection mirror (M) are so arranged that the image of the light source is formed at the position of the aperture stop (A). Thus, this optical arrangement conforms to that of the so-called Koehler illumination. In FIG. 12, the light source image is shown as converging on a single point, but in reality it is formed as an image having certain dimensions. The light beam reflected from the reflection mirror (M) passes through the rear lens unit (GrR), and then enters a color separating/integrating prism (Pr1), where the light beam is separated into a plurality of light beams of different colors so as to illuminate the display surfaces of a plurality of reflection-type display panels (P) individually, with the light beam of each color illuminating the entire display surface of the corresponding display panel. It should be noted that, in FIG. 12, only one display panel (P) for one of the colors used is illustrated.

Since the reflection-type display panel (P) employs a reflection-type liquid crystal panel, the light beam that illuminates the display panel (P) is reflected according to the pattern formed by the pixels of the display panel (P). The light beam reflected from the display panel (P) is then, by the color separating/integrating prism (Pr1), formed into a single light beam to be projected (hereafter referred to as the "projection light beam"), which then passes through the rear lens unit (GrR). Thereafter, the projection light beam passes, at the position of the aperture stop (A) where the reflection mirror (M) is disposed, through the other half of the aperture stop that is not covered by the reflection mirror (M). Thus, the projection light beam that has passed through the aperture stop (A) without striking the reflection mirror (M) forms, through the front lens unit (GrF), a display image on the screen (S).

In a case where a high-power light source such as a metal halide lamp is employed as the light source (1) in order to secure sufficiently bright illumination in the image projector, it is customary to use an integrator, because it helps prevent uneven illumination as may be caused by such a light source, and make the most of the light beam emitted from the light source (1) for the illumination of the surface of the display panel (P). For example, Japanese Laid-Open Patent Applications No. H9-243990 and others propose image projectors that are based on the above-described illumination method (FIG. 12) and that additionally include an integrator. The integrator employed in these examples is of the type that has two lens arrays of which each is composed of an array (i.e. rows and columns) of lens elements.

The recent trend toward more compact display panels has been accompanied by the trend toward more compact projection optical systems. As a natural consequence of this trend, projection optical systems have come to have smaller and smaller aperture diameters. On the other hand, if a high-power light source is employed in a projector to obtain brighter illumination, it is inevitable to use a reflector having an accordingly large diameter. In cases where the aperture diameter is small and the reflector diameter is large, it is difficult to realize an optical arrangement based on the illumination method proposed by Japanese Laid-Open Patent Application No. H9-243990, because of the excessively great difference between the diameter of the second lens array, which has to be disposed at the position of the aperture stop (A), and that of the first lens array, which has to be disposed immediately behind the reflector (2). In particular, it is extremely difficult to realize such an optical arrangement in a projection television system of a backward-projection type (rear type), where the focal length of the projection optical system tends to be short and thus the aperture diameter tends to be small.

SUMMARY OF THE INVENTION

An object of the present invention is to provide an image projector that, despite having compact reflection-type display panels, allows the use of an integrator and a high-power light source without sacrificing the compactness of its projection and illumination optical systems and without a loss of optical performance.

To achieve the above object, according to one aspect of the present invention, an image projector is provided with an illumination optical system, a reflection-type display panel, a projection optical system, and light-introducing means. The illumination optical system emits illumination light. The reflection-type display panel is illuminated by the illumination light emitted from the illumination optical system and is divided into a plurality of pixels so as to reflect the incoming illumination light selectively in accordance with the pattern formed by those pixels and thereby produce projection light. The projection optical system transmits the projection light reflected from the reflection-type display panel so as to project the pattern formed by the pixels onto a projection plane on which is formed a projected image, and is composed of, from a projected-image side, a front lens unit, an aperture stop, and a rear lens unit. The light-introducing means is disposed between the front and rear lens units of the projection optical system and directs the illumination light emitted from the illumination optical system to the reflection-type display panel. Additionally, the projection optical system fulfills the following condition:

$$0.2 \leq \gamma F \leq 0.8$$

where $\gamma F$ represents the angular magnification of the front lens unit (or, in a case where the front lens unit is not an afocal optical system, the ratio of the angle at which paraxial off-axial rays that pass through the aperture stop enter the front lens unit to the angle at which those rays emerge from the front lens unit).

According to another aspect of the present invention, an image projector is provided with an illumination optical system, a reflection-type display panel, a projection optical system, and light-introducing means. The illumination optical system emits illumination light. The reflection-type display panel is illuminated by the illumination light emitted from the illumination optical system and is divided into a plurality of pixels so as to reflect the incoming illumination light selectively in accordance with the pattern formed by those pixels and thereby produce projection light. The projection optical system transmits the projection light reflected from the reflection-type display panel so as to project the pattern formed by the pixels onto a projection plane on which to form a projected image, and is composed of, from a projected-image side, a front lens unit, an aperture stop, and a rear lens unit. The light-introducing means is disposed between the front and rear lens units of the projection optical system, and forms the light-source image of the illumination light emitted from the illumination optical system at a position of the aperture stop of the projection optical system so as to illuminate the reflection-type display panel.

BRIEF DESCRIPTION OF THE DRAWINGS

This and other objects and features of this invention will become clear from the following description, taken in conjunction with the preferred embodiments with reference to the accompanied drawings in which:

FIGS. 2A to 2C are graphic representations of the aberrations observed in the projection optical system of Examples 1 and 2;

FIGS. 11A to 11C are graphic representations of the aberrations observed in the projection optical system of Example 3.

DESCRIPTION OF THE PREFERRED EMBODIMENTS

Hereinafter, image projectors embodying the present invention will be described with reference to the accompanying drawings. Note that, in the following descriptions, the components that play the same or corresponding roles in different embodiments will be identified with the same reference symbols, and overlapping descriptions will be omitted.

Figure 1:
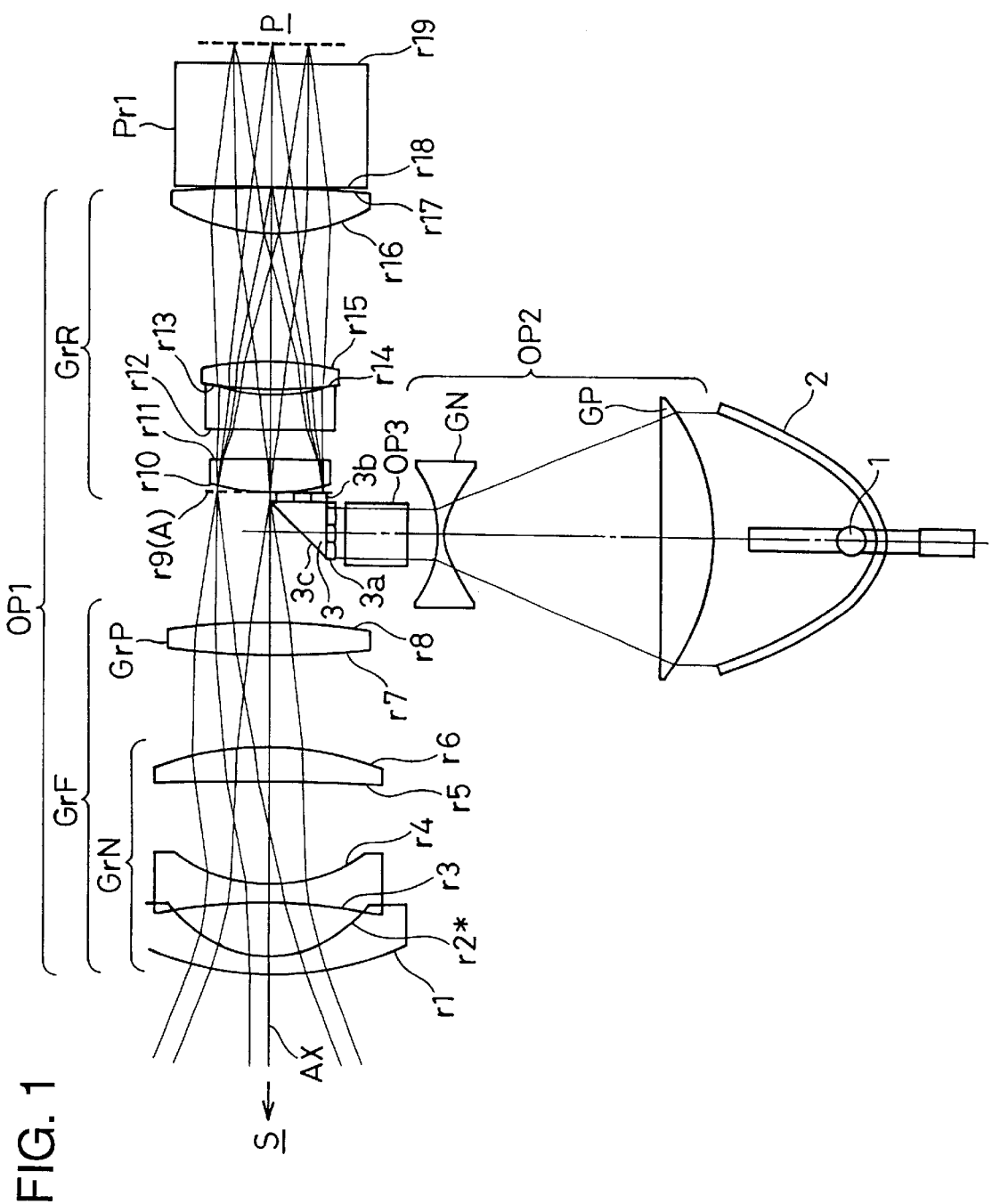
FIG. 1 is an optical arrangement diagram of the image projector of a first embodiment (Example 1) of the present invention.
Figure 3:
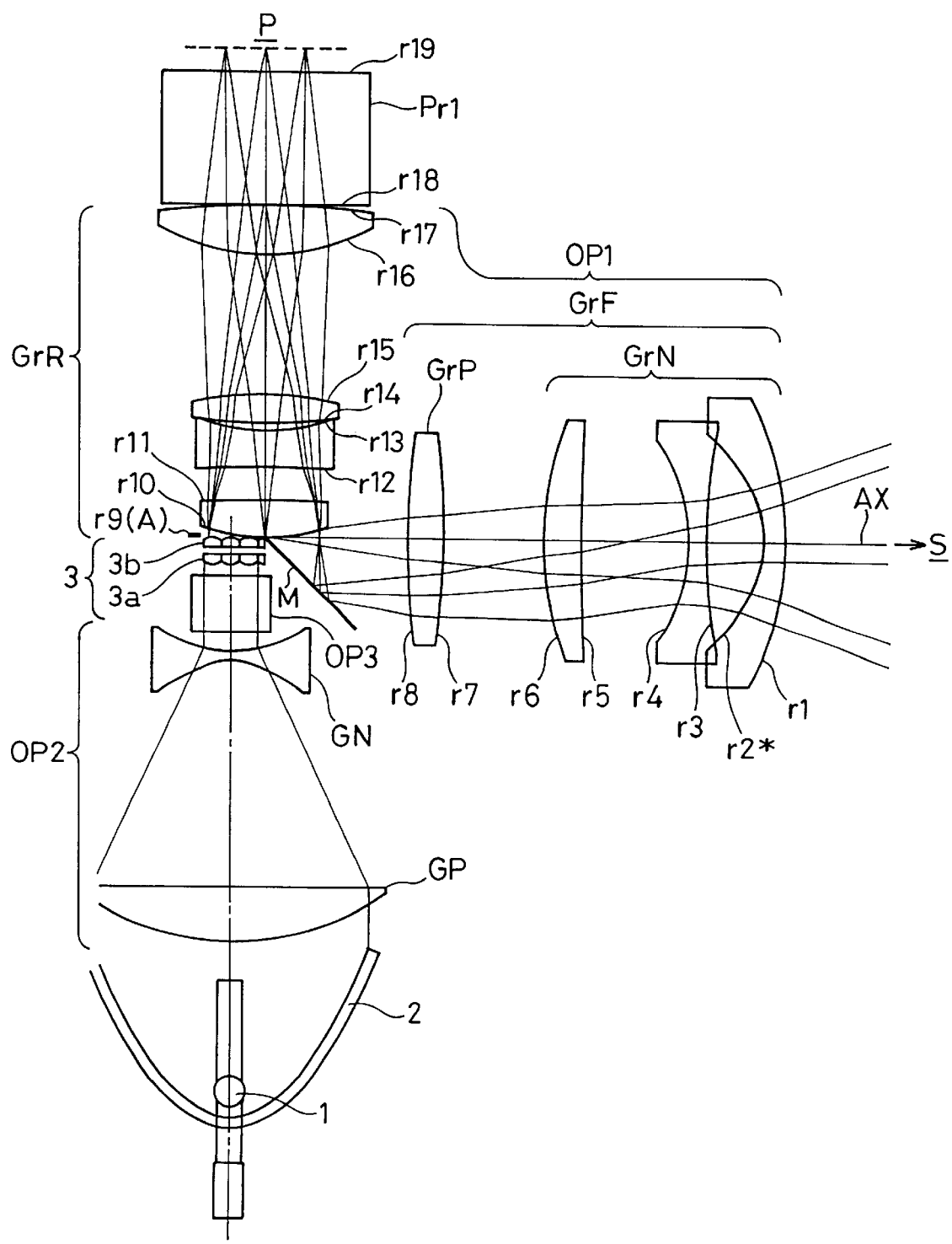
FIG. 3 is an optical arrangement diagram of the image projector of a second embodiment (Example 2) of the present invention.
Figure 10:
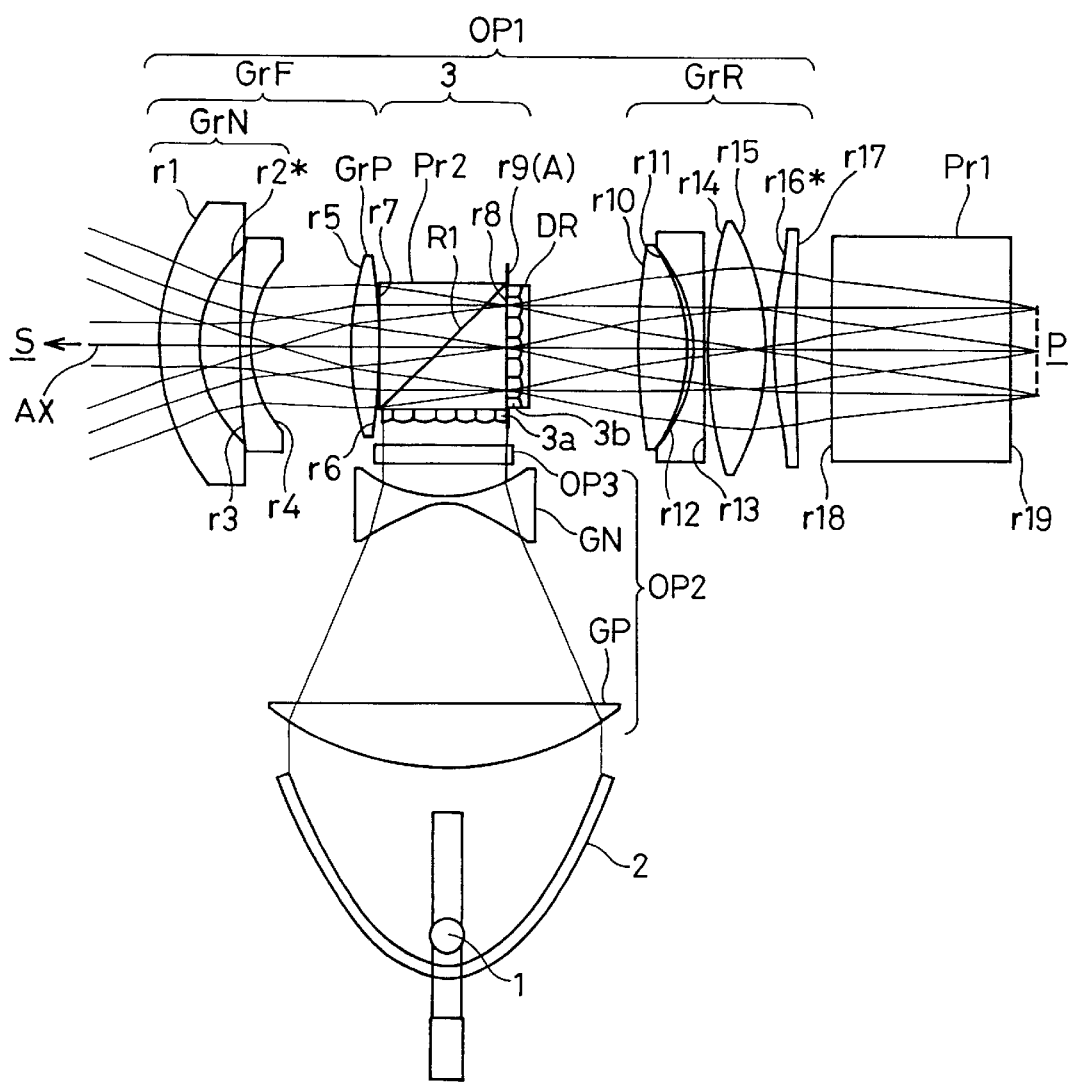
FIG. 10 is an optical arrangement diagram of the image projector of a third embodiment (Example 3) of the present invention.
Figure 12:
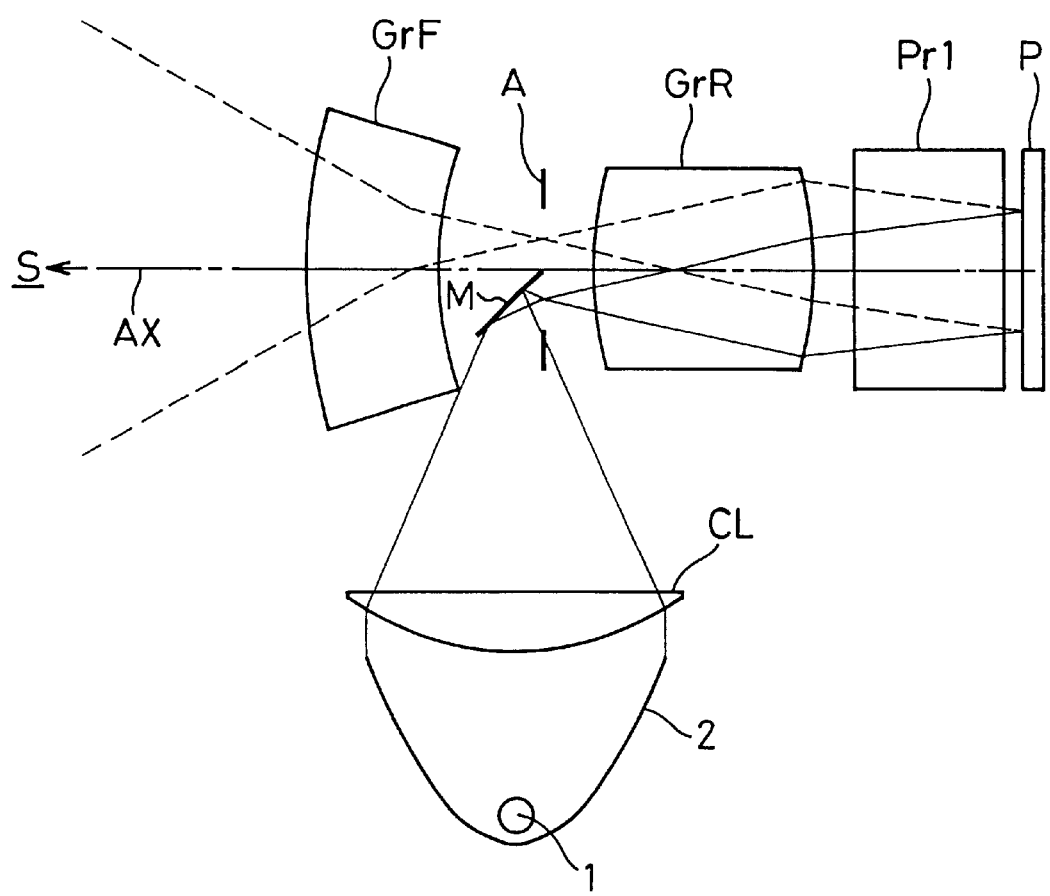
FIG. 12 is an optical arrangement diagram of a conventional example of an image projector.

FIGS. 1, 3, and 10 are optical arrangement diagrams of the image projectors of a first, a second, and a third embodiment, respectively, of the present invention. In all of these embodiments, the image projector is designed for use in an image projection apparatus of a rear type, and is provided with an illumination optical system for illuminating a plurality of reflection-type display panels (P) and a projection optical system (OP1) for projecting the images displayed on those reflection-type display panels (P) onto a screen (S). In each embodiment, the projection optical system (OP1), which constitutes a part of the image projector, is built as a fixed-focal-length lens system, wherein a surface marked with ri (i=1, 2, 3, . . . ) is the ith surface counted from the enlargement side (i.e. the screen (S) side), a surface ri marked with an asterisk (*) is an aspherical surface.

<First Embodiment (FIG. 1)>

The image projector of the first embodiment is so designed that illumination light is bent by a reflecting surface (3c) of an integrator (3). This image projector has a projection optical system (OP1) that is composed of, from a screen (S) side, a front lens unit (GrF), an aperture stop (A), and a rear lens unit (GrR), and that is designed to be telecentric (toward the reduction side); in addition, an integrator (3) serving as a light-introducing means for directing illumination light toward a plurality of reflection-type display panels (P) is disposed between the front lens unit (GrF) on one side, and the aperture stop (A) with the rear lens unit (GrR), on the other. The front lens unit (GrF), which constitutes a part of the projection optical system (OP1), is composed of, from the screen (S) side, a negative lens unit (GrN) and a positive lens unit (GrP), and is built as a substantially afocal optical system that offers an angular magnification of about 0.38. The negative lens unit (GrN), which constitutes a part of the front lens unit (GrF), is composed of two negative lens elements including a negative meniscus lens element having a convex surface on the screen (S) side thereof, and a single positive lens element. On the reduction side of the projection optical system (OP1) is disposed a color separating/integrating prism (Pr1); in addition, a plurality of reflection-type display panels (P) are provided one for each of the light beams obtained as the result of the color separation achieved by the color separating/integrating prism (Pr1) (note that, in FIG. 1, only one display panel (P) for one of the colors used is illustrated).

The integrator (3) is of a lens-array type, meaning that it forms a plurality of light source images through a first lens array (3a) on a second lens array (3b). Specifically, the integrator (3) is composed of an optical member that has a first and a second lens array (3a and 3b) formed integrally together with a reflecting surface (3c) between them. The second lens array (3b) is disposed at the position of the aperture stop (A). The reflecting surface (3c) is disposed in the vicinity of the aperture stop (A), more specifically on the screen (S) side of the aperture stop (A) so as to cover about a half of the aperture diameter. This reflecting surface (3c) allows illumination light to pass through one half of the aperture stop (A) toward the reflection-type display panels (P), and projection light to pass through the other half of the aperture stop (A) toward the screen (S).

Each of the lens elements constituting the first and second lens arrays (3a and 3b) has substantially the same aspect ratio as the display panels (P). Moreover, the individual lens elements constituting the first lens array (3a) are so arranged as to be conjugate with the reflection-type display panels (P) through the corresponding lens elements constituting the second lens array (3b), so that the surfaces of the reflection-type display panels (P) are illuminated evenly and efficiently. Note that the lens elements of the first and second lens arrays (3a and 3b) exert strong optical powers on a condensed light beam, and, in addition, the optical paths through the first and second lens arrays (3a and 3b) are short. Accordingly, it is preferable that the first and second lens arrays (3a and 3b) be made of a material having a refractive index (Nd) as high as 1.7 or more for the d-line.

The previously-mentioned illumination optical system has a reduction optical system (OP2) composed of a positive plano-convex lens element (GP) and a negative biconcave lens element (GN), and also has a polarization conversion optical system (OP3), which will be described later. The reduction optical system (OP2) serves to condense the parallel light beam coming from the reflector (2) into a parallel beam having a smaller beam diameter. In order to obtain a sufficiently parallel light beam, it is preferable that at least one of the positive and the negative lens elements (GP and GN) be so formed as to have an aspherical surface. The aspherical surface is so shaped that its curvature decreases gradually from the center to the edge. In the reduction optical system (OP2) employed in this embodiment, the biconcave lens element (GN) has an aspherical surface on the reflector (2) side thereof.

The light beam from a light source (1) is formed into a substantially parallel beam by the reflector (2), and is then condensed by the reduction optical system (OP2). Thereafter, the condensed light beam enters the polarization conversion optical system (OP3) so as to be subjected to polarization conversion, and is then directed, through the integrator (3), into the projection optical system (OP1). In the integrator (3), the first lens array (3a) focuses the incoming parallel light so as to form an image on the second lens array (3b), and simultaneously, an illumination light beam is bent by the reflecting surface (3c). The light beam, after forming a light source image on the second lens array (3b) disposed at the position of the aperture stop (A), passes through the rear lens unit (GrR), and then enters the color separating/integrating prism (Pr1), where the light beam is separated into a plurality of light beams of different colors so as to illuminate the display surfaces of the reflection-type display panels (P) individually, with the light beam of each color illuminating the entire display surface of the corresponding display panel. As the light-introducing means, instead of the integrator (3), it is possible to use, for example, a kaleidoscope that forms a light-source image near the aperture stop (A) of the projection optical system (OP1).

On reaching the reflection-type display panels (P), the illumination light is reflected in accordance with the patterns of the pixels formed by the individual display panels (P). In a case where reflection-type liquid crystal panels are employed as the reflection-type display panels (P), the liquid crystal panels are each fitted with a polarizing filter immediately in front of them so as to act as LCD (liquid crystal display) panels that reflect only a light component whose polarizing plane is not changed by the liquid crystal. Note that this polarizing filter is so arranged as to be aligned with the direction in which the light beam is polarized by the polarization conversion optical system (OP3), which will be described later. The light beams reflected from the display panels (P) are directed to the color separating/integrating prism (Pr1) so as to be integrated into a single projection light beam. The projection light beam thus obtained first passes through the rear lens unit (GrR), and then, at the position of the aperture stop (A), passes through that half of the aperture stop that is not covered by the integrator (3). Thus, the projection light beam that has passed through the aperture stop (A) without striking the integrator (3) forms, through the front lens unit (GrF), a display image on the screen (S).

In an image projector designed for use in an image projection apparatus of a rear type, it is preferable that its projection optical system (OP1) be designed to offer a wide angle of view (i.e. a short focal length). The wider the angle of view, the smaller the aperture diameter. However, in this embodiment, where illumination light is introduced at the position of the aperture stop (A), it is essential to make the aperture diameter relatively large. In this embodiment, the angular magnification of the substantially afocal front lens unit (GrF) is made relatively small, and instead the focal length of the rear lens unit (GrR) is made relatively long. As a result, a relatively large aperture diameter is obtained. To obtain a relatively large aperture diameter, it is preferable that Condition (I) below be fulfilled.

$$0.2 \leq \gamma F \leq 0.8 \tag{I}$$

where

γF represents the angular magnification of the front lens unit (GrF) (in a case where the front lens unit (GrF) is not designed to be afocal, the ratio of the angle at which paraxial off-axial rays that pass through the aperture stop (A) enter the front lens unit (GrF) to the angle at which those rays emerge from the front lens unit (GrF)).

If the lower limit of Condition (I) is exceeded, the aperture diameter becomes too large. As a result, although the design of the illumination optical system can be simplified, both the illumination optical system and the projection optical system (OP1) become unduly large. If the upper limit of Condition (I) is exceeded, the aperture diameter becomes too small if the projection optical system (OP1) has a wide angle of view. This makes the design of the illumination optical system difficult. Moreover, securing a large space in front of or behind the aperture stop (A) to accommodate a light-introducing means (in this embodiment, the integrator (3)) having a reflecting surface in the vicinity of the aperture stop (A) seriously degrades the optical performance. To obtain a particularly wide angle of view in a particularly compact image projector, it is preferable that Condition (I') below be fulfilled.

$$0.3 \leq \gamma F \leq 0.6 \tag{I'}$$

In a case where the angular magnification γF of the front lens unit (GrF) is made comparatively low, by designing the negative lens unit (GrN) to be composed of two or more negative lens elements including one negative meniscus lens element having a convex surface on its screen (S) side surface, it is possible to obtain satisfactory optical performance. In an optical system that has a comparatively low angular magnification but has a wide angle of view as a whole, it is preferable that the negative meniscus lens element have on the panel (P) side thereof an aspherical surface that is so shaped that its curvature decreases gradually from the center to the edge. Moreover, in a case where the front lens unit (GrF) is designed to be far from being afocal, if the positive optical power of the front lens unit (GrF) becomes too strong, the illumination optical system needs to have an unduly large size; in contrast, if the negative optical power of the front lens unit (GrF) becomes too strong, the rear lens unit (GrR) needs to have an unduly large size. Accordingly, it is preferable that Condition (II) below be fulfilled that defines how far the front lens unit (GrF) is from being afocal.

$$-1.5 < \phi F/\phi < 1.0 \tag{II}$$

where $\phi F$ represents the optical power of the front lens unit (GrF) of the projection optical system (OP1) (i.e. the total optical power available on the screen (S) side of the position at which illumination light is introduced); and $\phi$ represents the optical power of the entire projection optical system (OP1).

<Second Embodiment (FIG. 3)>

The image projector of the second embodiment is so designed that projection light is bent by a reflection mirror (M). That is, in contrast to the image projector of the first embodiment, in which illumination light is bent by a reflecting surface (3c) of an integrator (3) disposed in the vicinity of an aperture stop (A), that of the second embodiment is so designed that projection light is bent by a reflection mirror (M) disposed in the vicinity of an aperture stop (A). An illumination light beam first passes through a first and a second lens array (3a and 3b), then, without being reflected by a reflecting surface, passes through a rear lens unit (GrR) of a projection optical system (OP1), and then illuminates the display surfaces of a plurality of reflection-type display panels (P) (of which only one is shown in FIG. 3). The projection light beam reflected from the display panel (P) is bent by a reflection mirror (M), whereby it is shone through a front lens unit (GrF) onto a screen (S).

To prevent uneven illumination effectively by means of an integrator (3), it is essential to increase the number of constituent array elements of the first and second lens arrays (3a and 3b) and simultaneously shorten the focal lengths thereof in order to reduce the distance between the first and second lens arrays (3a and 3b). In contrast to the first embodiment, where it is necessary to secure a sufficient space for the reflection surface (3c) between the first and second lens arrays (3a and 3b), in this embodiment, in which the projection light beam is bent by the reflection mirror (M), it is possible to reduce the distance between the first and second lens arrays (3a and 3b) and thus prevent uneven illumination effectively by increasing the number of constituent array elements of the first and second lens arrays (3a and 3b).

<Polarization Conversion in the First and Second Embodiments>

In a case where reflection-type liquid crystal panels are employed as the reflection-type display panels (P), only the light component that is polarized in a particular polarizing plane is actually used to display an image. That is, the light component that is polarized in the opposite polarizing plane is of no use. However, by the use of a polarization conversion optical system (OP3), which will be described later, it is possible to convert the light component polarized in the opposite polarizing plane into a light component polarized in the desired polarizing plane, and thereby achieve effective use of light. As described above, it is advisable to keep the gap between the first and second lens arrays (3a and 3b) as small as possible, and therefore it is preferable that the polarization conversion optical system (OP3) be disposed in a position other than the space secured between the first and second lens arrays (3a and 3b). The region on the panel (P) side of the second lens array (3b) belongs to the projection optical system (OP1). Thus, it is impossible to dispose the polarization conversion optical system (OP3) there because it requires a considerable space. However, the polarization conversion optical system (OP3) can be disposed in the region between the reflector (2) and the first lens array (3a). In particular, the space between the reduction optical system (OP2) and the first lens array (3a) is suitable for the polarization conversion optical system (OP3), because, there, the light beam has a smaller beam diameter than elsewhere. If the polarization conversion optical system (OP3) is disposed, as in the first and second embodiments, between the reduction optical system (OP2) and the first lens array (3a), it is possible to use a compact polarization conversion optical system (OP3), and thereby effectively reduce the size and the cost. A few practical examples of the configuration of the polarization conversion optical system (OP3) will be described below.

Figure 4:
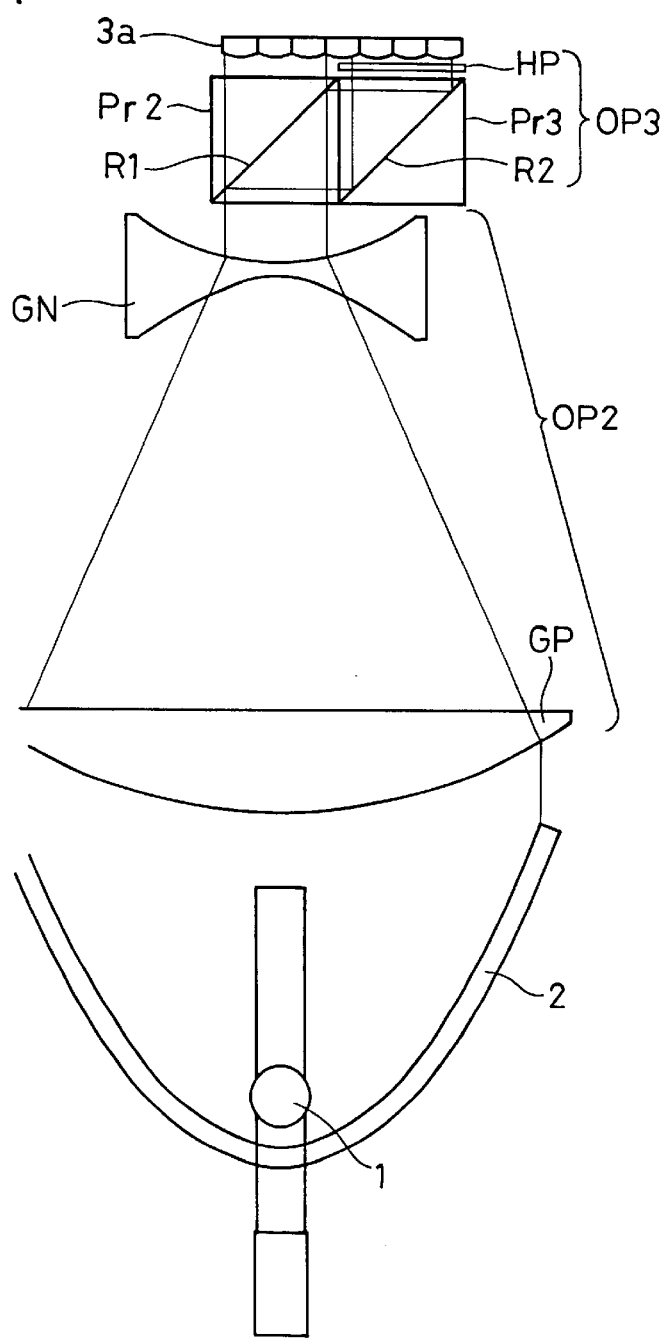
FIG. 4 is an optical arrangement diagram illustrating Practical Example 1 of the polarization conversion optical system.
Figure 5:
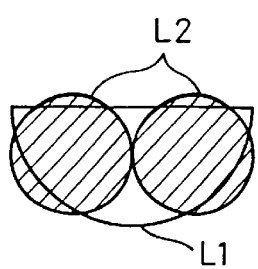
FIG. 5 is a diagram illustrating the relationship in terms of position and size between the circular light beam and the semicircular aperture opening in Practical Example 1.

<Practical Example 1 of the Polarization Conversion Optical System (OP3) (FIGS. 4 and 5>

The polarization conversion optical system (OP3) of Practical Example 1 is composed of a polarizing separating prism (a polarization beam splitter) (Pr2) having a polarizing separating reflecting surface (R1), a prism (Pr3) having a normal reflecting surface (R2), and a halfwave plate (HP). The light beam that has been condensed by the reduction optical system (OP2) is then directed to the polarizing separating prism (Pr2) so as to be separated into a P wave and an S wave. The P wave passes through the polarizing separating reflecting surface (R1), and the S wave is reflected from the polarizing separating reflecting surface (R1). The S wave reflected therefrom is then reflected from the reflecting surface (R2) of the prism (Pr3) and is thereby bent so as to travel in the same direction as the P wave reflected from the polarizing separating reflecting surface (R1). The S wave reflected from the reflecting surface (R2) then passes through the halfwave plate (HP) and is thereby formed into a P wave. As a result, the illumination light beam is made to include only a P– wave light component. Note that, by disposing the halfwave plate (HP) on the exit-surface side of the polarizing separating prism (Pr2), it is possible to make the illumination light beam have only an S-wave light component. That is, by disposing the halfwave plate (HP) either in the path of the P wave or in the path of the S wave, it is possible to unify the polarization direction of the illumination light beam.

The light beam that has just passed through the reduction optical system (OP2) has a circular section. After passing through the polarization conversion optical system (OP3) of Practical Example 1, the light beam is separated into two light beams (L2) each having a circular section as shown in FIG. 5. In the first and second embodiments, the illumination light beam passes through about a half of the aperture stop (A). Thus, for the illumination light beam, the opening of the aperture stop (A) is semicircular (L1). As shown in FIG. 5, which illustrates the relationship in terms of size and position between the two circular light beams (L2) and the semicircular opening (L1) of the aperture stop (A), it is preferable that the direction in which the illumination light beam is separated by the polarization conversion optical system (OP3) (into the two circular light beams (L2)) be aligned with the length direction of the semicircular opening (L1). This makes it possible to minimize the eclipse of the light beam, and thus use the entire aperture stop (A) effectively. Note that, in reality, those portions of the two circular light beams (L2) which fall outside the semicircular opening (L1) of the aperture stop (A) may be cut by giving appropriate shapes to the first and second lens arrays (3a and 3b).

Figure 6:
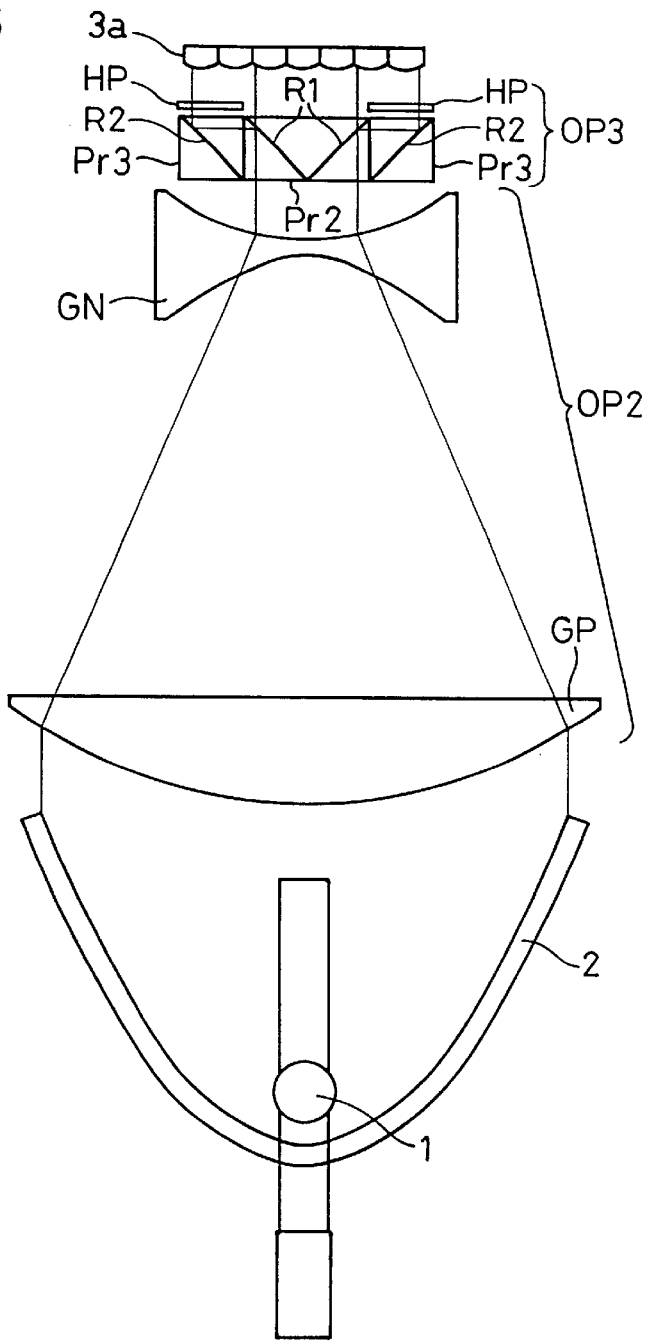
FIG. 6 is an optical arrangement diagram illustrating Practical Example 2 of the polarization conversion optical system.

<Practical Example 2 of the Polarization Conversion Optical System (OP3) (FIGS. 6 and 7)>

Practical Example 2 is a modified version of Practical Example 1 described above. The polarization conversion optical system (OP3) of Practical Example 2 is composed of a polarizing separating prism (Pr2) having two polarizing separating reflecting surfaces (R1), two prisms (Pr3) each having a normal reflecting surface (R2), and two halfwave plates (HP). The light beam that has been condensed by the reduction optical system (OP2) is then directed to the polarizing separating prism (Pr2) so as to be separated into a P wave and an S wave. The P wave passes through the polarizing separating reflecting surface (R1). The S wave is reflected from the polarizing separating reflecting surface (R1) toward the right-hand and left-hand prisms (Pr3). The S waves so reflected are then reflected from the reflecting surfaces (R2) of the prisms (Pr3) and are thereby bent so as to travel in the same direction as the P wave transmitted through the polarizing separating reflecting surface (R1). The S waves reflected from the reflecting surfaces (R2) then pass through the halfwave plates (HP), and are thereby formed into P waves.

Figure 7:
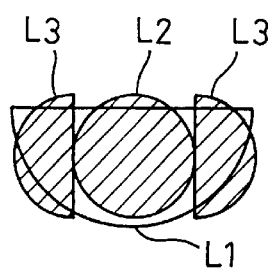
FIG. 7 is a diagram illustrating the relationship in terms of position and size between the circular light beam and the semicircular aperture opening in Practical Example 2.

The light beam that has just passed through the reduction optical system (OP2) has a circular section. As shown in FIG. 7, after passing through the polarization conversion optical system (OP3) of Practical Example 2, the light beam is separated into one light beam (L2) having a circular section and two light beams (L3) each having a semicircular section. As shown in FIG. 7, which illustrates the relationship in terms of size and position between these light beams (L2 and L3) and the semicircular opening (L1) of the aperture stop (A), it is preferable that the direction in which the light beam is separated (the direction in which the light beams (L2 and L3) are arranged) be aligned with the length direction of the semicircular opening (L1). This makes it possible to minimize the eclipse of the light beam and thereby use the entire aperture stop (A) effectively. Note that, in reality, those portions of the light beams (L2 and L3) which fall outside the semicircular opening (L1) of the aperture stop (A) may be cut by giving appropriate shapes to the first and second lens arrays (3a and 3b).

Figure 8:
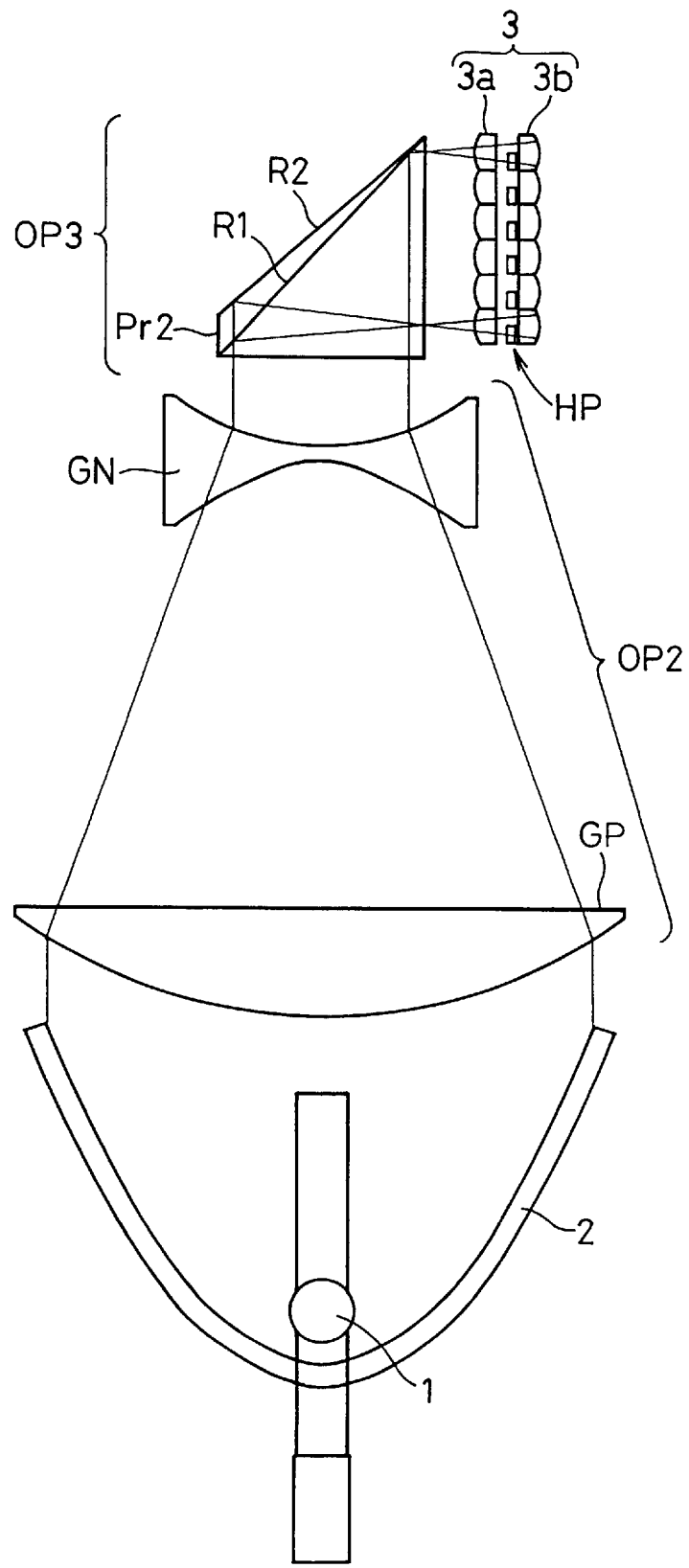
FIG. 8 is an optical arrangement diagram illustrating Practical Example 3 of the polarization conversion optical system.

<Practical Example 3 of the Polarization Conversion Optical System (OP3) (FIGS. 8 and 9)>

In contrast to the polarization conversion optical system (OP3) employed in the first and second embodiments, that of Practical Example 3 is composed of a polarization conversion optical system (OP3) as employed in the first embodiment and an integrator (3) combined into a single unit. That is, this polarization conversion optical system (OP3) is composed of a polarizing separating prism (Pr2) and a plurality of halfwave plates (HP). The polarizing separating prism (Pr2) has a polarizing separating reflecting surface (R1) and a normal reflecting surface (R2). The halfwave plates (HP) are disposed between a first and a second lens array (3a and 3b) so as to correspond to the individual lens elements thereof. The light beam that has been condensed by the reduction optical system (OP2) is bent by the two reflecting surfaces (R1 and R2). The polarizing separating reflecting surface (R1), which reflects only the S wave, is so inclined as to reflect the incoming light beam at an obtuse angle slightly greater than 90°. On the other hand, the reflecting surface (R2), which reflects the P wave that has passed through the polarizing separating reflecting surface (R1), is so inclined as to reflect the incoming light beam at an acute angle slightly smaller than 90°.

The S wave reflected from the polarizing separating reflecting surface (R1) and the P wave reflected from the reflecting surface (R2) enter the first lens array (3a) at different angles. Thus, the S and P waves are focused on different portions of the surface of each of the lens elements constituting the second lens array (3b). Here, the angles of reflection achieved on the reflecting surfaces (R1 and R2) are so adjusted as to allow the P wave to be focused in one half of the surface of each of the lens elements constituting the second lens array (3b), and allow the S wave to be focused in the other half. The halfwave plates (HP) are disposed so as to cover either the P-wave or the S-wave focusing portions of each of those lens elements, whereby the polarization direction of the P wave or S wave is changed. This makes it possible to unify the polarization direction of the light beam. In a case where the reflection-type display panels (P) are of a rectangular shape, to achieve effective use of light, it is preferable that the direction of the polarization conversion achieved by the polarization conversion method under discussion (the direction in which an angle difference is introduced between the P and S waves by the polarizing separating prism (Pr2), that is, the direction in which the light beam is separated into the P and S waves) be aligned with the length direction of the panels (P).

Figure 9:
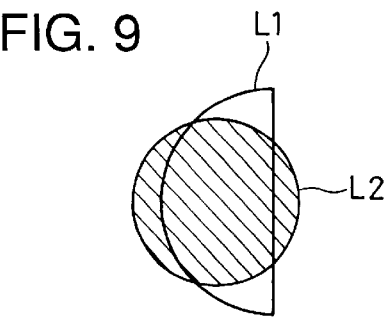
FIG. 9 is a diagram illustrating the relationship in terms of position and size between the circular light beam and the semicircular aperture opening in Practical Example 3.

In Practical Example 3, in contrast to Practical Examples 1 and 2, the illumination light beam continues to have a substantially circular section even after being subjected to polarization conversion. As shown in FIG. 9, which illustrates the relationship in terms of position and size between the circular light beam (L2) and the semicircular opening (L1) of the aperture stop (A), it is preferable that the circular light beam (L2) have a diameter smaller than the diameter of the aperture stop (A) and greater than the radius thereof. If the diameter of the circular light beam (L2) is identical with that of the aperture stop (A), about a half of the circular light beam (L2) does not pass through the aperture stop (A), and thus it is not possible to make efficient use of light. Moreover, if the diameter of the circular light beam (L2) is identical with the radius of the aperture stop (A), the whole of the circular light beam (L2) can pass through the aperture stop (A), but simultaneously the illumination light beam is too condensed to make efficient use of light, and in addition, there appears a region in the projection optical system (OP1) that is left unused by the light beam. Note that it is possible to omit those portions of the first and second lens arrays (3a and 3b) that lie in the path of the portions of the light beam that will eventually be intercepted at the edge of the semicircular (D-shaped) opening (L1) of the aperture stop (A).

<Third Embodiment (FIG. 10)>

The image projector of the third embodiment is so designed that only an S-wave component of the illumination light beam is reflected from a polarizing separating prism (Pr2), which is disposed in the vicinity of an aperture stop (A), toward display panels (P), and only a P wave component of the projection light beam is transmitted therethrough toward a screen (S). This image projector has an integrator (3) composed of a first and a second lens array (3a and 3b), and the polarizing separating prism (Pr2). The second lens array (3b) has on the panel (P) side thereof a birefringent material layer (DR) made of a birefringent material such as liquid crystal. The birefringent material layer (DR) exhibits a refractive index different from that of the second lens array (3b) with respect to the S wave, but exhibits a refractive index equal to that of the second lens array (3b) with respect to the P wave. Accordingly, when the S wave passes through the second lens array (3b) and then through the birefringent material layer (DR), the second lens array (3b) does act as a lens array without being affected by the birefringent material layer (DR). On the other hand, when the P wave passes through the second lens array (3b) and then through the birefringent material layer (DR), the second lens array (3b) and the birefringent material layer (DR) together act merely as a parallel flat plate against the P wave.

The illumination light beam exiting from the polarization conversion optical system (OP3), now composed solely of an S-wave component, enters the polarizing separating prism (Pr2), which constitutes a part of the integrator (3). The S-wave illumination light beam that has passed through the first lens array (3b) is then reflected from the polarizing separating reflecting surface (R1) of the polarizing separating prism (Pr2), and is then focused onto the second lens array (3b) disposed at the position of the aperture stop (A). The S-wave illumination light beam that has been reflected from the polarizing separating prism (Pr2) then illuminates the entire display surfaces of the reflection-type display panels (P) by the effect produced by the second lens array (3b).

The reflection-type display panels (P) employed in the third embodiment are of the type that convert an S wave into a P wave where the pixels are turned on. The light beam converted into a P wave by being reflected from the display panel (P) passes through the rear lens unit (GrR) toward the screen (S), and then reaches the birefringent material layer (DR) and then the second lens array (3b). The second lens array (3b), having the birefringent material layer (DR), does not act as a lens array against the P wave. Thus, when the P wave passes through them, the second lens array (3b) and the birefringent material layer (DR) together act merely as a parallel flat plate. The P wave that has entered the polarizing separating prism (Pr2) then passes through its polarizing separating reflecting surface (R1) without being reflected therefrom, and then, through the front lens unit (GrF), reaches the screen (S). Note that the S-wave light beam reflected from the panel (P) is then reflected from the polarizing separating reflecting surface (R1), and therefore does not enter the front lens unit (GrF).

EXAMPLES

Hereinafter, examples of the image projectors embodying the present invention will be presented with reference to the construction data, graphic representations of aberrations, and other data of their projection optical system (OP1). Table 1 lists the construction data of the projection optical system (OP1) of Examples 1 and 2, and Table 2 lists the construction data of the projection optical system (OP1) of Example 3. These Examples 1 to 3 respectively correspond to the first to third embodiments described above and have optical arrangements as shown in FIGS. 1, 3, and 10.

In the construction data of the projection optical system (OP1) of each example, ri (i=1, 2, 3, . . . ) represents the radius of curvature of the ith surface counted from the enlargement side (i.e. the screen (S) side), and di (i=1, 2, 3, . . . ) represents the ith axial distance counted from the enlargement side (dS represents the distance between the screen (S) and the screen (S)-side end surface (ri) of the projection optical system (OP1)). Ni (i=1, 2, 3, . . . ) and vi (i=1, 2, 3, . . . ) respectively represent the refractive index (Nd) and the Abbe number (vd), for d-line, of the ith optical element counted from the enlargement side. Also listed are the maximum image height Ymax, the values corresponding to the relevant conditions, and other related data.

Furthermore, a surface whose radius of curvature ri is marked with an asterisk (*) is an aspherical surface, whose surface shape is defined by Formula (AS) below. Also listed in the construction data are the aspherical coefficients of each aspherical surface and other data.

$$X = (C \cdot Y^2)/(1 + \sqrt{1 - \varepsilon \cdot C^2 \cdot Y^2}) + \sum (Ai \cdot Y^i) \quad (AS)$$

where

X represents the displacement from the reference surface in the optical axis (AX) direction;

Y represents the height in a direction perpendicular to the optical axis (AX);

C represents the paraxial curvature;

ε represents the quadric surface parameter; and

Ai represents the aspherical coefficient of the ith order.

FIGS. 2A to 2C are graphic representations of the aberrations observed at the reduction side in Examples 1 and 2. FIGS. 11A to 11C are graphic representations of the aberrations observed at the reduction side in Example 3. Of these diagrams, FIGS. 2A and 11A show spherical aberration (i.e. longitudinal spherical aberration); FIGS. 2B and 11B show astigmatism (i.e. astigmatic field curves); and FIGS. 2C and 11C show distortion. In the spherical aberration diagrams, the broken line represents the aberration for c-line (wavelength: 656.3 nm), the solid line represents the aberration for d-line (wavelength: 587.6 nm), and the dash-and-dot line represents the aberration for g-line (wavelength: 435.8 nm). For spherical aberration (given in mm along the horizontal axis), the values obtained by normalizing the height of incidence with respect to the maximum height are taken along the vertical axis. For astigmatism (given in mm along the horizontal axis) and distortion (given in % along the horizontal axis), the image height (mm) is taken along the vertical axis. In the astigmatism diagrams, the solid line S and the solid line T represent the astigmatism on the sagittal plane and on the tangential plane, respectively. Note that, in practical use, the projection optical system has the image plane on the screen (S) and has the object plane on the surface of the reflection-type display panel (P). However, in the above examples, the projection optical system is regarded as a reduction system having the object plane on the screen (S), and its optical performance is evaluated on the reflection-type display panel (P).

As described heretofore, according to the present invention, in an image projector, even if relatively small reflection-type display panels (P) are used, it is possible to make the aperture diameter as large as possible without sacrificing the compactness and without sacrificing satisfactory optical performance of the projection optical system and the illumination optical system. This makes it possible to employ an integrator and a high-efficiency light source. For example, it is possible to use an integrator and a high-efficiency light source even in a recent projection television system of a rear type that employs compact reflection-type display panels. Moreover, in a case where the illumination optical system is built as a reduction optical system, it is possible to use even smaller reflection-type display panels.

TABLE 1

<<Construction Data of Projection Optical System (OP1) of Examples 1 and 2>>

Ymax = 20.9
φ = 0.0356
φF = −0.0033
Conditions (I) and (I'): γF = 0.38
Condition (II): φF/φ = −0.0927

| Radius of Curvature | Axial Distance | Refractive Index | Abbe Number |
|---|---|---|---|
| {Screen (S)} | | | |
| | dS = 845.000000 | | |
| <Front Lens Unit (GrF)> | | | |
| <Negative Lens Unit (GrN)> | | | |
| r1 = 91.78096 | | | |
| | d1 = 5.500000 | N1 = 1.49140 | ν1 = 59.93 |
| r2* = 30.00000 | | | |
| | d2 = 15.526601 | | |
| r3 = −174.79218 | | | |
| | d3 = 5.500000 | N2 = 1.654852 | ν2 = 55.72 |
| r4 = 47.92606 | | | |
| | d4 = 30.035094 | | |
| r5 = −692.00608 | | | |
| | d5 = 10.000000 | N3 = 1.817727 | ν3 = 32.22 |
| r6 = −96.46593 | | | |
| | d6 = 27.308628 | | |
| <Positive Lens Unit (GrP)> | | | |
| r7 = 198.52936 | | | |
| | d7 = 10.000000 | N4 = 1.669311 | ν4 = 54.99 |
| r8 = −219.20044 | | | |
| | d8 = 38.228567{Integrator (3) or Reflection Mirror (M)} | | |
| <Aperture Stop (A)> | | | |
| r9 = ∞ | | | |
| | d9 = 0.100000 | | |
| <Rear Lens Unit (GrR)> | | | |
| r10 = 61.02136 | | | |
| | d10 = 10.000000 | N5 = 1.487490 | ν5 = 70.44 |
| r11 = −329.08394 | | | |
| | d11 = 8.805590 | | |
| r12 = −1943.42005 | | | |
| | d12 = 10.000000 | N6 = 1.798500 | ν6 = 22.60 |
| r13 = 47.99384 | | | |
| | d13 = 2.128741 | | |
| r14 = 156.53712 | | | |
| | d14 = 8.133669 | N7 = 1.754500 | ν7 = 51.57 |
| r15 = −90.96977 | | | |
| | d15 = 37.694214 | | |
| r16 = 57.65593 | | | |
| | d16 = 13.443351 | N8 = 1.590333 | ν8 = 59.69 |
| r17 = −254.27776 | | | |
| | d17 = 0.100000 | | |
| <Color Separating/Integrating Prism (Pr1)> | | | |
| r18 = ∞ | | | |
| | d18 = 36.000000 | N9 = 1.516800 | ν9 = 64.12 |
| r19 = ∞ | | | |
| | d19 = 5.999753 | | |
| {Reflection-type Display Panel (P)} | | | |

[Aspherical Coefficients of 2nd Surface (r2)]
ε = 0.03
A4 = 0.237021 × $10^{-5}$
A6 = −0.434844 × $10^{-8}$
A8 = 0.708935 × $10^{-11}$
A10 = 0.647949 × $10^{-14}$
A12 = 0.152778 × $10^{-17}$

TABLE 2

<<Construction Data of Projection Optical System (OP1) of Example 3>>

Ymax = 20.9
φ = 0.0358
φF = −0.0004
Conditions (I) and (I''): γF = 0.55
Condition (II): φF/φ = −0.0112

| Radius of Curvature | Axial Distance | Refractive Index | Abbe Number |
|---|---|---|---|
| {Screen (S)} | | | |
| | dS = 845.000000 | | |
| <Front Lens Unit (GrF)> | | | |
| <Negative Lens Unit (GrN)> | | | |
| r1 = 53.65689 | | | |
| | d1 = 10.000000 | N1 = 1.834387 | ν1 = 41.41 |
| r2* = 28.68577 | | | |
| | d2 = 9.940042 | | |
| r3 = 214.83798 | | | |
| | d3 = 2.800000 | N2 = 1.710031 | ν2 = 52.64 |
| r4 = 32.58226 | | | |
| | d4 = 24.060430 | | |
| <Positive Lens Unit (GrP)> | | | |
| r5 = 76.90179 | | | |
| | d5 = 6.751110 | N3 = 1.850000 | ν3 = 40.04 |
| r6 = −147.68450 | | | |
| | d6 = 0.100000 | | |
| <Polarizing separating prism (Pr2)> | | | |
| r7 = ∞ | | | |
| | d7 = 30.336000 | N4 = 1.516800 | ν4 = 65.26 |
| r8 = ∞ | | | |
| | d8 = 0.000000 | | |
| <Aperture Stop (A)> | | | |
| r9 = ∞ | | | |
| | d9 = 31.638659 | | |
| <Rear Lens Unit (GrR)> | | | |
| r10 = 171.65358 | | | |
| | d10 = 12.054459 | N5 = 1.627529 | ν5 = 57.23 |
| r11 = −39.68992 | | | |
| | d11 = 1.352800 | | |
| r12 = −35.01697 | | | |
| | d12 = 2.800000 | N6 = 1.764543 | ν6 = 24.23 |
| r13 = −1962.54668 | | | |
| | d13 = 0.744422 | | |
| r14 = 108.99450 | | | |
| | d14 = 14.011345 | N7 = 1.708361 | ν7 = 53.27 |
| r15 = −62.87504 | | | |
| | d15 = 2.416859 | | |
| r16* = 84.33803 | | | |
| | d16 = 5.145542 | N8 = 1.49140 | ν8 = 59.93 |
| r17 = 746.33260 | | | |
| | d17 = 8.959087 | | |
| <Color Separating/Integrating Prism (Pr1)> | | | |
| r18 = ∞ | | | |
| | d18 = 41.225245 | N9 = 1.516800 | ν9 = 64.12 |
| r19 = ∞ | | | |
| | d19 = 5.999997 | | |
| {Reflection-type Display Panel (P)} | | | |

[Aspherical Coefficients of 2nd Surface (r2)]
ε = 1.0
A4 = −0.121996 × $10^{-5}$
A6 = −0.788620 × $10^{-8}$
A8 = 0.452734 × $10^{-11}$
A10 = 0.281555 × $10^{-14}$
A12 = −0.180179 × $10^{-16}$

[Aspherical Coefficients of 16th Surface (r16)]
ε = 1.0
A4 = −0.239194 × $10^{-5}$
A6 = −0.523377 × $10^{-8}$
A8 = −0.533220 × $10^{-12}$

What is claimed is:

1. An image projector comprising:
an illumination optical system for emitting illumination light;
a reflection-type display panel for being illuminated by the illumination light, the reflection-type display panel being divided into a plurality of pixels, the reflection-type display panel being for reflecting incoming illumination light selectively in accordance with a pattern formed by the plurality of pixels thereby producing projection light;
a projection optical system for transmitting the projection light so as to project the pattern formed by the plurality of pixels onto a projection plane to thereby form a projected image, the projection optical system comprising, from a projected-image side, a front lens unit, an aperture stop, and a rear lens unit; and light-introducing means being disposed between the front and rear lens units of the projection optical system, for directing the illumination light emitted from the illumination optical system to the reflection-type display panel, wherein the projection optical system fulfills the following condition:

$$0.2 \leq \gamma F \leq 0.8$$

where $\gamma F$ represents either an angular magnification of the front lens unit if the front lens unit is an afocal optical system, or a ratio of an angle at which paraxial off-axial rays that pass through the aperture stop enter the front lens unit to an angle at which the rays emerge from the front lens unit if the front lens unit is not an afocal optical system.

2. An image projector as claimed in claim 1, wherein the following condition is fulfilled:

$$-1.5 < \phi F/\phi < 1.0$$

where $\phi F$ represents an optical power of the front lens unit of the projection optical system; and $\phi$ represents an optical power of the entire projection optical system.

3. An image projector as claimed in claim 1, wherein the front lens unit comprises, from the projected-image side, a negative lens unit and a positive lens unit, the negative lens unit comprising two or more lens elements including a negative meniscus lens element having a convex surface on the projected-image side.

4. An image projector as claimed in claim 1, wherein the light-introducing means includes a reflecting surface near the aperture stop.

5. An image projector as claimed in claim 4, wherein the illumination light passes through approximately one half of the aperture stop, and the projection light passes through a remainder of the aperture stop.

6. An image projector as claimed in claim 1, wherein the light-introducing means is a polarizing separating prism.

7. An image projector as claimed in claim 1, wherein the illumination optical system includes a reduction optical system which comprises a positive lens element and a negative lens element.

8. An image projector as claimed in claim 7, wherein the illumination optical system includes an aspherical surface on at least one of the positive and negative lens elements.

9. An image projector as claimed in claim 1, wherein the projection optical system includes an optical axis that extends, without being bent, from the reflection-type display panel to the projection plane.

10. An image projector as claimed in claim 1, wherein the projection optical system includes an optical axis that is bent perpendicularly once by a reflection mirror disposed between the front lens unit and the rear lens unit.

11. An image projector as claimed in claim 1, wherein the light-introducing means is an integrator of a lens-array type disposed near the aperture stop of the projection optical system.

12. An image projector as claimed in claim 1, wherein the light-introducing means is a kaleidoscope for forming a light-source image near the aperture stop of the projection optical system.

13. An image projector comprising:

an illumination optical system for emitting illumination light;

a reflection-type display panel for being illuminated by the illumination light, the reflection-type display panel being divided into a plurality of pixels, the reflection-type display panel being for reflecting incoming illumination light selectively in accordance with a pattern formed by the plurality of pixels thereby producing projection light;

a projection optical system for transmitting the projection light so as to project the pattern formed by the plurality of pixels onto a projection plane to thereby form a projected image, the projection optical system comprising, from a projected-image side, a front lens unit, an aperture stop, and a rear lens unit; and light-introducing means being disposed between the front and rear lens units of the projection optical system, for directing the illumination light emitted from the illumination optical system to the reflection-type display panel, wherein the illumination optical system is arranged so as to form a light source image of the illumination light emitted from the illumination optical system at a position of the aperture stop, and wherein the projection optical system fulfills the following condition:

$$0.2 \leq \gamma F \leq 0.8$$

where $\gamma F$ represents either an angular magnification of the front lens unit if the front lens unit is an afocal optical system, or a ratio of an angle at which paraxial off-axial rays that pass through the aperture stop enter the front lens unit to an angle at which the rays emerge from the front lens unit if the front lens unit is not an afocal optical system.

14. An image projector as claimed in claim 13, wherein the following condition is fulfilled:

$$-1.5 < \phi F < 1.0$$

where $\phi F$ represents an optical power of the front lens unit of the projection optical system; and $\phi$ represents an optical power of the entire projection optical system.

15. An image projector as claimed in claim 13, wherein the front lens unit comprises, from the projected-image side, a negative lens unit and a positive lens unit, the negative lens unit comprising two or more lens elements including a negative meniscus lens element having a convex surface on the projected-image side.

16. An image projector as claimed in claim 13, wherein the light-introducing means includes a reflecting surface near the aperture stop.

17. An image projector as claimed in claim 13,
wherein the illumination light passes through approximately one half of the aperture stop, and the projection light passes through a remainder of the aperture stop.

18. An image projector as claimed in claim 13,
wherein the light-introducing means is a polarizing separating prism.

19. An image projector as claimed in claim 13,
wherein the illumination optical system includes a reduction optical system which comprises a positive lens element and a negative lens element.

20. An image projector as claimed in claim 19,
wherein the illumination optical system includes an aspherical surface on at least one of the positive and negative lens elements.

21. An image projector as claimed in claim 13,
wherein the projection optical system includes an optical axis that extends, without being bent, from the reflection-type display panel to the projection plane.

22. An image projector as claimed in claim 13,
wherein the projection optical system includes an optical axis that is bent perpendicularly once by a reflection mirror disposed between the front lens unit and the rear lens unit.

23. An image projector as claimed in claim 13,
wherein the light-introducing means is an integrator of a lens-array type disposed near the aperture stop of the projection optical system.

24. An image projector as claimed in claim 13,
wherein the light-introducing means is a kaleidoscope for forming a light-source image near the aperture stop of the projection optical system.

25. An image projector comprising:

a reflection-type display panel;

a projection optical system for transmitting projection light, the projection optical system comprising, from a projected-image side, a front lens unit, an aperture stop, and a rear lens unit; and light-introducing means being disposed between the front lens unit and the rear lens unit of the projection optical system, wherein the projection optical system fulfills the following condition:

$$0.2 \leq \gamma F \leq 0.8$$

where $\gamma F$ represents either an angular magnification of the front lens unit if the front lens unit is an afocal optical system, or a ratio of an angle at which paraxial off-axial rays that pass through the aperture stop enter the front lens unit to an angle at which the rays emerge from the front lens unit if the front lens unit is not an afocal optical system.

* * * * *